(12) United States Patent  (10) Patent No.: US 9,946,682 B2
Lin  (45) Date of Patent: Apr. 17, 2018

(54) DETECTING DEVICE INSTALLATION AND REMOVAL ON A PORT

(71) Applicant: Hewlett-Packard Development Company, L.P., Houston, TX (US)

(72) Inventor: Hsin-Tso Lin, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 220 days.

(21) Appl. No.: 14/762,231

(22) PCT Filed: Jan. 28, 2013

(86) PCT No.: PCT/US2013/023403
§ 371 (c)(1),
(2) Date: Jul. 21, 2015

(87) PCT Pub. No.: WO2014/116247
PCT Pub. Date: Jul. 31, 2014

(65) Prior Publication Data
US 2015/0324321 A1    Nov. 12, 2015

(51) Int. Cl.
*G06F 13/10* (2006.01)
*G06F 13/42* (2006.01)
*G06F 9/445* (2018.01)
*G06F 1/26* (2006.01)

(52) U.S. Cl.
CPC .......... *G06F 13/4282* (2013.01); *G06F 1/266* (2013.01); *G06F 9/44505* (2013.01)

(58) Field of Classification Search
None
See application file for complete search history.

(56) References Cited

U.S. PATENT DOCUMENTS

| 5,548,782 | A | 8/1996 | Michael et al. |
| 5,884,102 | A | 3/1999 | England et al. |
| 6,054,847 | A | 4/2000 | Garcia et al. |
| 6,141,212 | A | 10/2000 | Fletcher et al. |
| 6,601,124 | B1 | 7/2003 | Blair |
| 7,313,707 | B2 * | 12/2007 | Shaver .................... G06F 1/266 710/15 |
| 7,743,174 | B2 | 6/2010 | Remaker et al. |
| 2004/0186689 | A1 | 9/2004 | Chu et al. |
| 2005/0001179 | A1 | 1/2005 | Gisler et al. |
| 2005/0021890 | A1 | 1/2005 | Baker et al. |
| 2005/0204070 | A1 | 9/2005 | Shaver |

FOREIGN PATENT DOCUMENTS

| CN | 201600687 | 10/2010 |
| CN | 102890555 | 1/2013 |

OTHER PUBLICATIONS

Texas Instruments, Interface Circuits for TIA/EIA-232-F, 2002, Texas Instruments, pp. 1-22.*

(Continued)

*Primary Examiner* — Cheng-Yuan Tseng
(74) *Attorney, Agent, or Firm* — HP Inc Patent Department

(57) ABSTRACT

One example provides a system. The system includes a serial port and a circuit coupled to the serial port. The circuit is to detect an installation or removal of a device to the serial port and to remove power provided to the serial port in response to the detection.

20 Claims, 4 Drawing Sheets

(56) References Cited

OTHER PUBLICATIONS

DeviceMaster® RTS, 2012, pp. 1-2, Comtrol Corporation, Available at: <comtrol.com/modules/ecommerce/uploads/pdfs/PDF_167.pdf>.
PCT Search Report/Written Opinion—PCT Application No: PCT/US2013/023403 dated Oct. 29, 2013—11 pages.
Interface Circuits for TIA/EIA-232-F Copyright.2002, Texas Instruments Incorporated.

* cited by examiner

| DETECT PIN | GPIO0 | GPIO1 | PIN 1 | PIN 9 | MODE | |
|---|---|---|---|---|---|---|
| EDGE CHANGE | LOW | LOW | DCD# | RI# | UNPOWERED PORT | — 302 |
| LOW | LOW | LOW | DCD# | RI# | UNPOWERED PORT | — 304 |
| LOW | LOW | HIGH | RESERVED | RESERVED | RESERVED | — 306 |
| LOW | HIGH | LOW | +12V | +12V | +12V PORT | — 308 |
| LOW | HIGH | HIGH | +5V | +5V | +5V PORT | — 310 |

Fig. 3

DETECTING DEVICE INSTALLATION AND REMOVAL ON A PORT

BACKGROUND

A computer system may include any suitable number of ports, and each port may have a different function. One type of port is a serial port. A serial port may be configured to operate in an unpowered mode or in a powered mode. Any serial device having the proper connector, however, may be installed on the serial port whether or not the serial device is configured to operate in the unpowered mode or the powered mode.

BRIEF DESCRIPTION OF THE DRAWINGS

FIG. 3 is a table illustrating one example of the signal states for different modes of the serial port.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined with each other, unless specifically noted otherwise.

A serial port may be configured to operate in an unpowered mode, a +5 volt powered mode, or a +12 volt powered mode. Any suitable serial device, however, may be installed on the serial port whether or not the serial device is configured to operate in the unpowered mode, the +5 volt powered mode, or the +12 volt powered mode. Accordingly, if a serial device configured to operate in the unpowered mode is installed on a serial port configured to operate in the +5 volt powered mode or the +12 volt powered mode, the serial device may be damaged. This disclosure describes a serial port and serial port detection/switching circuit including a port detect pin to detect the installation and/or the removal of a serial device on the serial port. In response to detecting the installation or removal of a serial device on the serial port, the serial port is reset to operate in the unpowered mode. In this way, when a serial device is installed on the serial port, the serial device will not be damaged. Once the serial device is installed on the serial port, the user may be prompted to select the proper serial port mode (i.e., unpowered, +5 volts, or +12 volts) for the installed serial device.

Figure 1:
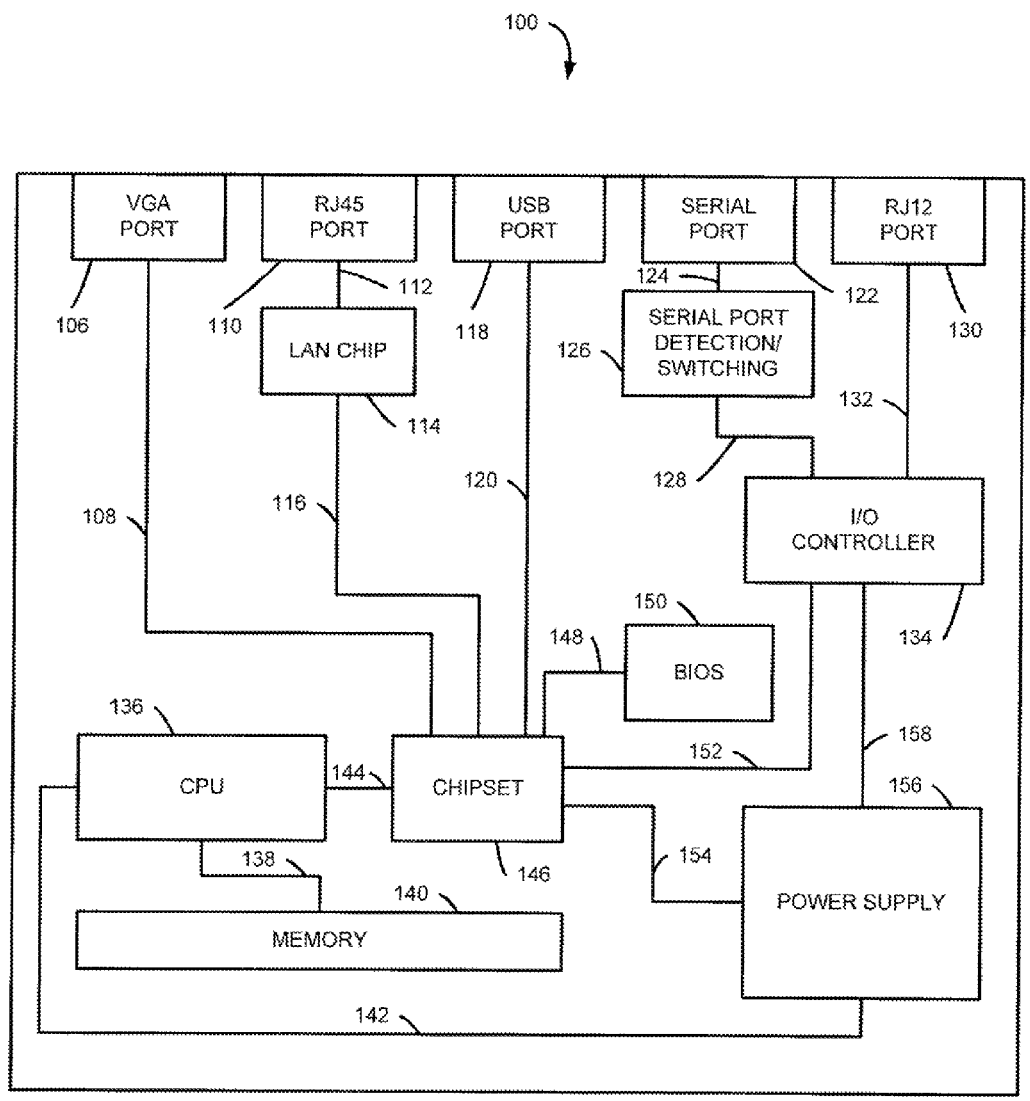
FIG. 1 is a block diagram illustrating one example of a system.

FIG. 1 is a block diagram illustrating one example of a system 100. In one example, system 100 is a Retail Point of Sale (RPOS) system for use in a retail environment. In other examples, system 100 is suitable for use in other environments. System 100 includes a Video Graphics Array (VGA) port 106, an RJ45 port 110, a Local Area Network (LAN) chip 114, a Universal Serial Bus (USB) port 118, a serial port 122, a serial port detection/switching circuit 126, and an RJ12 port 130. System 100 also includes an Input/Output (I/O) controller 134, a Basic Input/Output System (BIOS) 150, a Central Processing Unit (CPU) 136, a chipset 146, a memory 140, and a power supply 156.

VGA port 106 is communicatively coupled to chipset 146 through communication link 108. RJ45 port 110 is communicatively coupled to LAN chip 114 through communication link 112. LAN chip 114 is communicatively coupled to chipset 146 through communication link 116. USB port 118 is communicatively coupled to chipset 146 through communication link 120. Serial port 122 is communicatively coupled to serial port detection/switching circuit 126 through communication link 124. Serial port detection/switching circuit 126 is communicatively coupled to I/O controller 134 through communication link 128. RJ12 port 130 is communicatively coupled to I/O controller 134 through communication link 132.

I/O controller 134 is communicatively coupled to chipset 146 through communication link 152. I/O controller 134 is electrically coupled to power supply 156 through path 158. Power supply 156 is electrically coupled to chipset 146 through path 154 and to CPU 136 through path 142. CPU 136 is communicatively coupled to memory 140 through communication link 138 and to chipset 146 through communication link 144.

In one example, serial port 122 is an RS-232 serial port having a DB9 connector. Serial port 122 is configurable to operate in one of an unpowered mode, a +5 volt powered mode, and a +12 volt powered mode. Serial port 122 may be communicatively coupled to a pole display, a scale, a barcode scanner, a credit card reader, a printer, or another suitable serial device. Serial port detection/switching circuit 126 detects the installation and removal of a device on serial port 122 and sets serial port 122 to operate in one of the unpowered mode, the +5 volt powered mode, and the +12 volt powered mode.

In one example in the unpowered mode, serial port detection/switching circuit 126 passes nine serial communication signals between I/O controller 134 and serial port 122 including a Data Carrier Detect (DCD) signal and a Ring Indicator (RI) signal. In one example in the +5 volt powered mode, serial port detection/switching circuit 126 passes seven serial communication signals between I/O controller 134 and serial port 122 and supplies +5 volts to serial port 122 via the DCD and RI signal paths. In one example in the +12 volt powered mode, serial port detection/switching circuit 126 passes seven serial communication signals between I/O controller 134 and serial port 122 and supplies +12 volts to serial port 122 via the DCD and RI signal paths.

In one example, memory 140 stores instructions executed by CPU 136 for operating system 100. Memory 140 includes any suitable combination of volatile and/or non-volatile memory, such as combinations of Random Access Memory (RAM), Read-Only Memory (ROM), flash memory, and/or other suitable memory. In one example, memory 140 stores instructions executed by CPU 136 including instructions for configuring serial port 122 via serial port detection/switching circuit 126. In one example, CPU 136 executes instructions for a user interface such that a user of system 100 may configure serial port 122 to operate in the unpowered mode, the +5 volt powered mode, or the +12 volt powered mode. In another example, BIOS 150 is used to configure serial port 122 to operate in the unpowered mode, the +5 volt powered mode, or the +12 volt powered mode.

Chipset 146 routes communications between CPU 136, VGA port 106, LAN chip 114, USB port 118, BIOS 150, and I/O controller 134. I/O controller 134 routes communications between serial port 122 and chipset 146 and between RJ12 port 130 and chipset 152. LAN chip 114 provides an interface between RJ45 port 110 and chipset 146 to route communications between RJ45 port 110 and chipset 146. Power supply 156 provides power for system 100. In one example, power supply 156 provides multiple voltages for the different circuits of system 100, such as 1.5 volts, 1.8 volts, 3.3 volts, 5 volts, 12 volts, and/or 24 volts.

While system 100 includes one VGA port 106, one RJ45 port 110, one USB port 118, one serial port 122, and one RJ12 port 130, in other examples, system 100 includes any suitable number of ports such as more than one USB port and/or more than one serial port. VGA port 106 may be communicatively coupled to a monitor or another suitable visual display for system 100. RJ45 port 110 may be communicatively coupled to a network, such as an intranet or an Internet. USB port 118 may be a 5 volt USB port, a 12 volt USB port, or a 24 volt USB port. In other examples, system 100 may include more than one USB port, such as one 12 volt USB port and one 24 volt USB port. USB port 118 may be communicatively coupled to a pole display, a scale, a barcode scanner, a credit card reader, a printer, or another suitable device. RJ12 port 130 may be communicatively coupled to a cash drawer or another suitable device.

In operation, and with a device installed on serial port 122, serial port detection/switching circuit 126 operates serial port 122 in one of the unpowered mode, the +5 volt powered mode, and the +12 volt powered mode based on a user selected mode stored in memory 140 or in BIOS 150. In response to a device being installed or removed from serial port 122, serial port detection/switching circuit 126 resets serial port 122 to operate in the unpowered mode. In one example in response to serial port 122 being reset to operate in the unpowered mode, serial port/detection switching circuit 126 updates the selected mode stored in memory 140 or in BIOS 150 to the unpowered mode.

Figure 2:
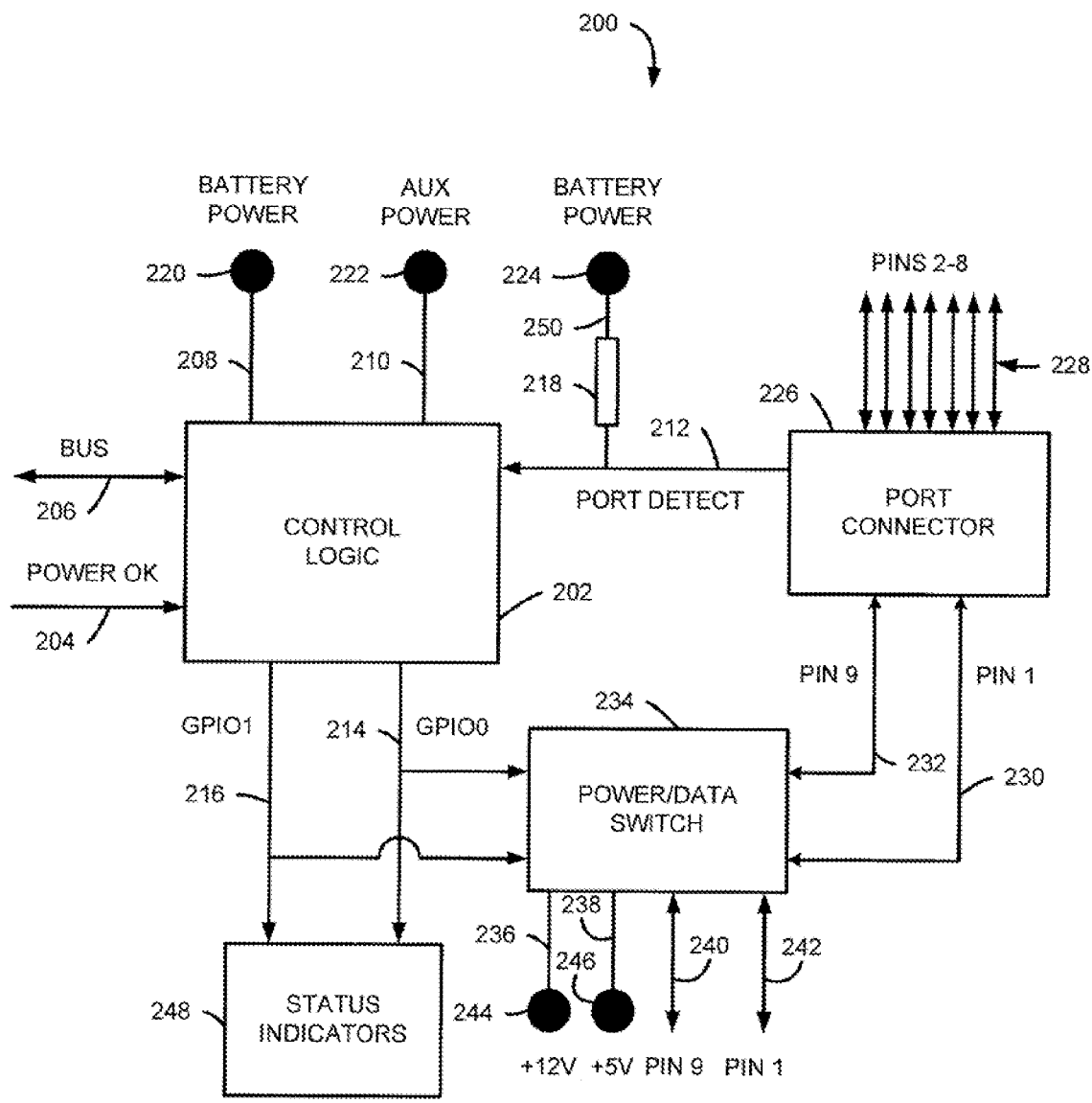
FIG. 2 is a block diagram illustrating one example of a serial port detection/switching circuit.

FIG. 2 is a block diagram illustrating one example of a serial port detection/switching circuit 200. In one example, serial port detection/switching circuit 200 provides serial port detection/switching circuit 126 previously described and illustrated with reference to FIG. 1. Serial port detection/switching circuit 200 includes control logic 202, resistor 218, port connector 226, power/data switch 234, and status indicators 248. In one example, control logic 202 is integrated in a single semiconductor chip. In another example, control logic 202 and power/data switch 234 are integrated in a single semiconductor chip.

Control logic 202 receives configuration signals through bus 206. In one example, bus 206 is an I2C bus, a Low Pin Count (LPC) bus, or another suitable bus. Control logic 202 receives a power ok signal through communication link 204. In one example, the power ok signal is an RSMRST# power ok signal, an auxiliary power ok signal, or another suitable power ok signal. Control logic 202 is electrically coupled to a battery power source 220 through path 208 and to an auxiliary power source 222 through path 210. In one example, auxiliary power source 222 is provided by power supply 156 (FIG. 1). Control logic 202 is electrically coupled to one terminal of resistor 218 and to port connector 226 through port detect pin signal path 212. Control logic 202 is electrically coupled to status indicators 248 and to power/data switch 234 through a first General Purpose Input/Output (GPIO0) signal path 214 and a second General Purpose Input/Output (GPIO1) signal path 216.

The other terminal of resistor 218 is electrically coupled to a battery power source 224 through path 250. Port connector 226 is electrically coupled to I/O controller 134 (FIG. 1) through pins 2-8 signal paths 228 for passing serial communication signals between I/O controller 134 and port connector 226. Port connector 226 is electrically coupled to power/data switch 234 through pin 1 signal path 230 and pin 9 signal path 232. Power/data switch 234 is electrically coupled to a +12 volt power supply 244 through path 236 and to a +5 volt power supply 246 through signal path 238. In one example, +12 volt power supply 244 and +5 volt power supply 246 are provided by power supply 156 (FIG. 1). Power/data switch 234 is electrically coupled to I/O controller 134 (FIG. 1) through pin 9 signal path 240 and pin 1 signal path 242.

With the power ok signal indicating that the auxiliary power is being supplied to control logic 202, control logic 202 is enabled. With control logic 202 enabled, control logic 202 sets the GPIO0 signal and the GPIO1 signal based on signals received through bus 206. Control logic 202 also monitors the port detect pin through port detect pin signal path 212 to determine whether a serial device is installed on port connector 226. With no device installed on port connector 226, battery power source 224 and resistor 218 provide a voltage (i.e., logic high) on port detect pin signal path 212, which is detected by control logic 202. In response to detecting the logic high on port detect pin signal path 212, control logic 202 sets and/or maintains the GPIO0 and GPIO1 signals to logic low.

When a device is installed on port connector 226, battery power source 224 and resistor 218 are coupled to ground through port connector 226. Accordingly, a ground (i.e., logic low) is detected on port detect pin signal path 212 by control logic 202. In response to detecting a transition from logic high to logic low on port detect pin signal path 212, control logic 202 sets and/or maintains the GPIO0 and GPIO1 signals to logic low. With a device installed on port connector 226, control logic 202 continues to detect a logic low on port detect pin signal path 212. In one example, after setting GPIO0 and GPIO1 signals to logic low in response to a device being installed on port connector 226, control logic 202 initiates a request to the user to configure the serial port to operate in the unpowered mode, the +5 volt powered mode, or the +12 volt powered mode. Once configured by the user to operate in the proper mode, control logic 202 sets and maintains the GPIO0 and GPIO1 signals for the selected mode until the serial device is removed from port connector 226.

Battery power source 220 maintains power to control logic 202 and battery power source 224 maintains power to resistor 218 and port detect pin signal path 212 even when auxiliary power source 222 is turned off. The removal of auxiliary power is indicated by the power ok signal. By maintaining power to at least portions of control logic 202 and to port detect pin signal path 212, control logic 202 maintains the logic state of the port detect pin (i.e., whether or not a device is installed on port connector 226) so that the GPIO0 and GPIO1 signals are not reset each time auxiliary power source 222 is turned off.

Status indicators 248 indicate the status of the serial port based on the GPIO0 and GPIO1 signals. In one example, status indicators 248 include Light Emitting Diodes (LEDs) to indicate whether the serial port is configured to operate in the unpowered mode, the +5 volt powered mode, or the +12 volt powered mode. In one example, three different colored LEDs are used to indicate which of the three modes is selected.

Power/Data switch 234 passes either +5 volts, +12 volts, or serial communication signals based on the GPIO0 and GPIO1 signals. In the unpowered mode, power/data switch 234 passes serial communication signals between pin 1 signal path 242 and pin 1 signal path 230 and between pin 9 signal path 240 and pin 9 signal path 232. In one example in the unpowered mode, power data switch 234 passes a DCD signal between pin 1 signal path 242 and pin 1 signal path 230 and passes a RI signal between pin 9 signal path 240 and pin 9 signal path 232. In the +5 volt powered mode, power/data switch 234 passes +5 volts from +5 volt power supply 246 to pin 1 signal path 230 and to pin 9 signal path 232. In the +12 volt powered mode, power/data switch 234 passes +12 volts from +12 volt power supply 244 to pin 1 signal path 230 and to pin 9 signal path 232.

FIG. 3 is a table 300 illustrating one example of the signal states for the different modes of the serial port. In response to detecting an edge change on the port detect pin signal path 212 (FIG. 2), either from logic high to logic low (i.e., device being installed on port connector 226) or from logic low to logic high (i.e., device being removed from port connector 226), control logic 202 (FIG. 2) sets the GPIO0 signal to logic low and the GPIO1 signal to logic low. With both the GPIO0 signal and the GPIO1 signal set to logic low, power/data switch 234 (FIG. 2) passes the DCD signal on pin 1 and the RI signal on pin 9. Accordingly, the serial port is configured to operate in the unpowered mode as indicated at 302. With a device installed on the serial port, the GPIO0 signal and the GPIO1 signal may be set by the user to configure the serial port to operate in the proper mode for the installed device.

In response to detecting a logic low (i.e., device is installed) on port detect pin signal path 212 and with the GPIO0 signal and the GPIO1 signal previously set to logic low, power/data switch 234 passes the DCD signal on pin 1 and the RI signal on pin 9. Accordingly, the serial port is configured to operate in the unpowered mode as indicated at 304. In response to detecting a logic low on the port detect pin signal path 212 and with the GPIO0 signal previously set to logic low and the GPIO1 signal previously set to logic high, power/data switch 234 is disabled. With power/data switch 234 disabled, pin 1 is reserved and pin 9 is reserved, thus the serial port is in a reserved mode as indicated at 306.

In response to detecting a logic low on port detect pin signal path 212 and with the GPIO0 signal previously set to logic high and the GPIO1 signal previously set to logic low, power/data switch 234 supplies +12 volts to pin and to pin 9. Accordingly, the serial port is configured to operate in the +12 volt powered mode as indicated at 308. Finally, in response to detecting a logic low on port detect pin signal path 212 and with the GPIO0 signal previously set to logic high and the GPIO1 signal previously set to logic high, power/data switch 234 supplies +5 volts to pin 1 and to pin 9. Accordingly, the serial port is configured to operate in the +5 volt powered mode as indicated at 310.

Figure 4A:
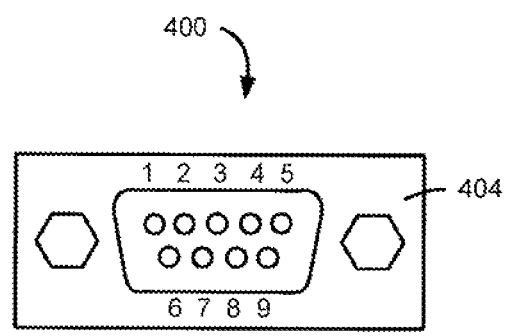
FIG. 4A is a diagram illustrating one example of a serial port.

FIG. 4A is a diagram illustrating one example of a serial port 400. In one example, serial port 400 provides port connector 226 previously described and illustrated with reference to FIG. 2. In one example, serial port 400 includes a DB9 connector including a metal shielding 404 and nine pins, which are assigned to pass serial communication signals as follows:

Pin 1: Data Carrier Detect (DCD) or +5 volts or +12 volts
Pin 2: Received Data (RD)
Pin 3: Transmitted Data (TD)
Pin 4: Data Terminal Ready (DTR)
Pin 5: Signal Ground (SG)
Pin 6: Data Set Ready (DSR)
Pin 7: Request to Send (RTS)
Pin 8: Clear to Send (CTS)
Pin 9: Ring Indicator (RI) or +5 volts or +12 volts Metal shielding 404 is electrically coupled to ground. As previously described, in the unpowered mode, pin 1 passes the DCD signal and pin 9 passes the RI signal. In the +5 volt powered mode, pin 1 provides +5 volts and pin 9 provides +5 volts. In the +12 volt powered mode, pin 1 provides +12 volts and pin 9 provides +12 volts.

Figure 4B:
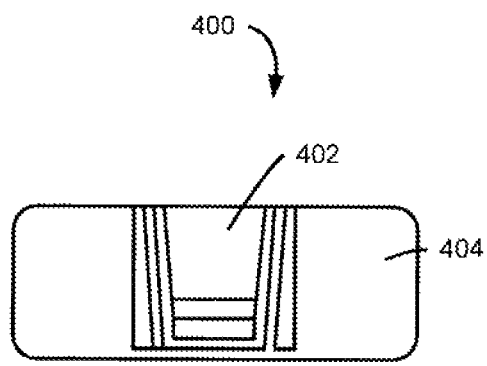
FIG. 4B is a diagram illustrating one example of a port detect pin integrated into the metal shielding of the serial port.

FIG. 4B is a diagram illustrating one example of a port detect pin 402 integrated into metal shielding 404 of serial port 400. FIG. 4B illustrates a top or bottom view of serial port 400. In one example, port detect pin 402 is a touch pin that is electrically coupled to ground when a device is installed on serial port 400 and electrically open when a device is not installed on serial port 400. In other examples, port detect pin 402 has other suitable configurations such that port detect pin 402 is electrically coupled to ground when a device is installed on serial port 400 and electrically open when a device is not installed on serial port 400. In one example upon installation of a device on serial port 400, port detect pin 402 is electrically coupled to ground prior to pin 1 and pin 9 of the device being electrically coupled to pin 1 and pin 9 of the serial port 400, respectively. In this way, power may be removed from serial port 400 prior to the device being completely installed on serial port 400, thereby preventing damage to the device.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A system comprising:
   a serial port; and
   a circuit coupled to the serial port, the circuit to:
   detect installation or removal of a device to the serial port;
   in response to a detection of installation of the device to the serial port, remove power provided to the serial port; and
   in response to a detection of removal of the device from the serial port, remove power provided to the serial port.

2. The system of claim 1, wherein the serial port comprises a DB9 serial port and a port detect pin integrated into a metal shielding of the DB9 serial port, the port detect pin to detect the installation or removal of a device to the serial port.

3. The system of claim 2, wherein the port detect pin is electrically coupled to ground with a device installed on the serial port and electrically open without a device installed on the serial port.

4. The system of claim 1, further comprising:
   a Basic Input/Output System (BIOS) to configure the serial port to operate in one of an unpowered mode, a +5 volt powered mode, and a +12 volt powered mode.

5. The system of claim 4, further comprising:
   status indicators to indicate whether the serial port is configured to operate in the unpowered mode, the +5 volt powered mode, or the +12 volt powered mode.

6. A system comprising:

a serial port comprising a port detect pin integrated into a metal shielding of the serial port; and control logic to:
- detect a ground on the port detect pin in response to a device being installed on the serial port;
- detect an electrical open on the port detect pin in response to a device being removed from the serial port;
- remove power provided to the serial port in response to a detection of a ground on the port detect pin; and
- remove power provided to the serial port in response to a detection of an electrical open on the port detect pin.

7. The system of claim 6, further comprising:

a power/data switch to provide one of serial communication signals, +5 volts, and +12 volts to the serial port with a device installed on the serial port.

8. The system of claim 7, further comprising:

status indicators to indicate whether the power/data switch is providing serial communication signals, +5 volts, or +12 volts to the serial port.

9. The system of claim 6, wherein the serial port comprises a DB9 serial port and the port detect pin is integrated into a metal shielding of the DB9 serial port.

10. A system comprising:

a port connector comprising nine pins and a further port detect pin integrated into a metal shielding of the port connector;

control logic electrically coupled to the port detect pin, the control logic to detect the installation of a device on the port connector by detecting a logic low on the port detect pin and to detect the removal of a device from the port connector by detecting a logic high on the port detect pin; and a power/data switch electrically coupled to the first pin, the ninth pin, and the control logic, the power/data switch to one of pass serial communication signals to the first pin and the ninth pin, provide +5 volts to the first pin and the ninth pin, and provide +12 volts to the first pin and the ninth pin based on signals received from the control logic.

11. The system of claim 10, wherein the control logic provides signals to the power/data switch to pass serial communication signals to the first pin and the ninth pin in response to detecting a transition between logic low and logic high on the port detect pin.

12. The system of claim 10, wherein the control logic, based on a previously selected mode and in response to detecting a logic low on the port detect pin, provides signals to the power/data switch to one of pass serial communication signals to the first pin and the ninth pin, provide +5 volts to the first pin and the ninth pin, and provide +12 volts to the first pin and the ninth pin.

13. The system of claim 10, further comprising:

status indicators electrically coupled to the control logic, the status indicators to indicate whether the power/data switch is passing serial communication signals to the first pin and the ninth pin, providing +5 volts to the first pin and the ninth pin, or providing +12 volts to the first pin and the ninth pin.

14. The system of claim 10, further comprising:

an auxiliary power source electrically coupled to the control logic; and a battery power source electrically coupled to the control logic, wherein the battery power source maintains the logic state detected on the port detect pin when the auxiliary power source is turned off.

15. The system of claim 10, further comprising:

a battery power source electrically coupled to the port detect pin to maintain the logic state on the port detect pin.

16. The system of claim 1, further comprising:

a power/data switch to provide one of serial communication signals, +5 volts, and +12 volts to the serial port with a device installed on the serial port.

17. The system of claim 16, wherein the power/data switch is electrically coupled to a first pin of the serial port, a ninth pin of the serial port, and the control logic.

18. The system of claim 17, wherein the power/data switch is to one of pass serial communication signals to the first pin and the ninth pin, provide +5 volts to the first pin and the ninth pin, and provide +12 volts to the first pin and the ninth pin based on signals received from the control logic.

19. The system of claim 7, wherein the power/data switch is electrically coupled to a first pin of the serial port, a ninth pin of the serial port, and the control logic.

20. The system of claim 19, wherein the power/data switch is to one of pass serial communication signals to the first pin and the ninth pin, provide +5 volts to the first pin and the ninth pin, and provide +12 volts to the first pin and the ninth pin based on signals received from the control logic.

* * * * *